United States Patent
Kamo et al.

(10) Patent No.: US 11,383,460 B2
(45) Date of Patent: Jul. 12, 2022

(54) METHOD FOR PRODUCING COMPOSITE MATERIAL

(71) Applicant: MITSUBISHI HEAVY INDUSTRIES, LTD., Tokyo (JP)

(72) Inventors: Sota Kamo, Tokyo (JP); Kiyoka Takagi, Tokyo (JP); Naomoto Ishikawa, Tokyo (JP); Hideki Horizono, Tokyo (JP); Wataru Nishimura, Tokyo (JP); Toshiyuki Takayanagi, Tokyo (JP); Nobuyuki Kamihara, Tokyo (JP); Naoaki Fujiwara, Tokyo (JP); Tsukasa Katsumata, Tokyo (JP); Kazuki Ohashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/767,328

(22) PCT Filed: Nov. 1, 2018

(86) PCT No.: PCT/JP2018/040764
§ 371 (c)(1),
(2) Date: May 27, 2020

(87) PCT Pub. No.: WO2019/159443
PCT Pub. Date: Aug. 22, 2019

(65) Prior Publication Data
US 2021/0078262 A1 Mar. 18, 2021

(30) Foreign Application Priority Data
Feb. 13, 2018 (JP) .............................. JP2018-023384

(51) Int. Cl.
*B29C 70/22* (2006.01)
*B29C 70/46* (2006.01)
(Continued)

(52) U.S. Cl.
CPC ............ *B29C 70/222* (2013.01); *B29C 70/46* (2013.01); *B29K 2105/0845* (2013.01); *B29L 2031/001* (2013.01)

(58) Field of Classification Search
USPC ...................................... 156/293, 303.1, 423
See application file for complete search history.

(56) References Cited

U.S. PATENT DOCUMENTS 3,349,537 A 10/1967 HHopfeld
5,188,872 A 2/1993 Quigley
(Continued)

FOREIGN PATENT DOCUMENTS

JP 5-459 1/1993
JP 5-508115 11/1993
(Continued)

OTHER PUBLICATIONS

International Search Report dated Jan. 15, 2019 in International (PCT) Patent Application No. PCT/JP2018/040764, with English Translation.
(Continued)

*Primary Examiner* — Barbara J Musser
(74) *Attorney, Agent, or Firm* — Wenderoth, Lind & Ponack, L.L.P.

(57) ABSTRACT

A desired shape can be easily realized, and a decrease in strength can be inhibited. A method for producing a composite material includes: an insertion step of inserting an inner member in which a second reinforcing fiber is impregnated with a resin into a space of an outer member that is formed of a woven first reinforcing fiber extending in an (Continued)

undulating manner, the outer member including an opening that is provided at at least one end portion and the space that communicates with the opening; and a composite material forming step of forming a composite material in which the outer member and the inner member are joined to each other by curing the resin of the inner member to join the outer member and the inner member to each other.

7 Claims, 10 Drawing Sheets

(51) Int. Cl.
*B29K 105/08* (2006.01)
*B29L 31/00* (2006.01)

(56) References Cited

U.S. PATENT DOCUMENTS

| | | | |
|---|---|---|---|
| 5,407,195 | A | 4/1995 | Tittola et al. |
| 8,642,158 | B2* | 2/2014 | Bogue ................... B29C 73/10 |
| | | | 428/116 |
| 8,991,900 | B2 | 3/2015 | Yamaji et al. |
| 9,693,166 | B2* | 6/2017 | Herrera ................... B32B 37/18 |
| 2002/0065154 | A1 | 5/2002 | Goldsmith et al. |
| 2009/0277579 | A1* | 11/2009 | Marelli ................... B29C 65/02 |
| | | | 156/293 |
| 2011/0030873 | A1 | 2/2011 | Stenard |
| 2011/0049750 | A1 | 3/2011 | Bechtold |
| 2011/0073407 | A1* | 3/2011 | Ayle ....................... F02C 7/045 |
| | | | 181/292 |
| 2015/0075663 | A1 | 3/2015 | Ma et al. |
| 2015/0217508 | A1* | 8/2015 | Rossi ................... B29C 70/504 |
| | | | 428/80 |
| 2016/0114884 | A1* | 4/2016 | Mandel ................... F16C 7/026 |
| | | | 244/102 R |
| 2016/0195063 | A1 | 7/2016 | Hoffmann |
| 2017/0043528 | A1* | 2/2017 | Conway ............. B29C 66/1122 |
| 2017/0080681 | A1 | 3/2017 | Montgomery et al. |
| 2017/0225769 | A1* | 8/2017 | Carlson ............... B29D 99/001 |
| 2017/0268137 | A1 | 9/2017 | Kamiya |

FOREIGN PATENT DOCUMENTS

| | | |
|---|---|---|
| JP | 2010-516512 | 5/2010 |
| JP | 2010-524718 | 7/2010 |
| JP | 2011-167951 | 9/2011 |
| JP | 2013-204744 | 10/2013 |
| JP | 2016-5955 | 1/2016 |
| JP | 2016-98467 | 5/2016 |
| JP | 2016-527112 | 9/2016 |
| WO | 2010/150682 | 12/2010 |

OTHER PUBLICATIONS

Written Opinion of the International Searching Authority dated Jan. 15, 2019 in International (PCT) Patent Application No. PCT/JP2018/040764, with English Translation.
Extended European Search Report dated Jul. 13, 2021 in European Patent Application No. 18906587.3.

* cited by examiner

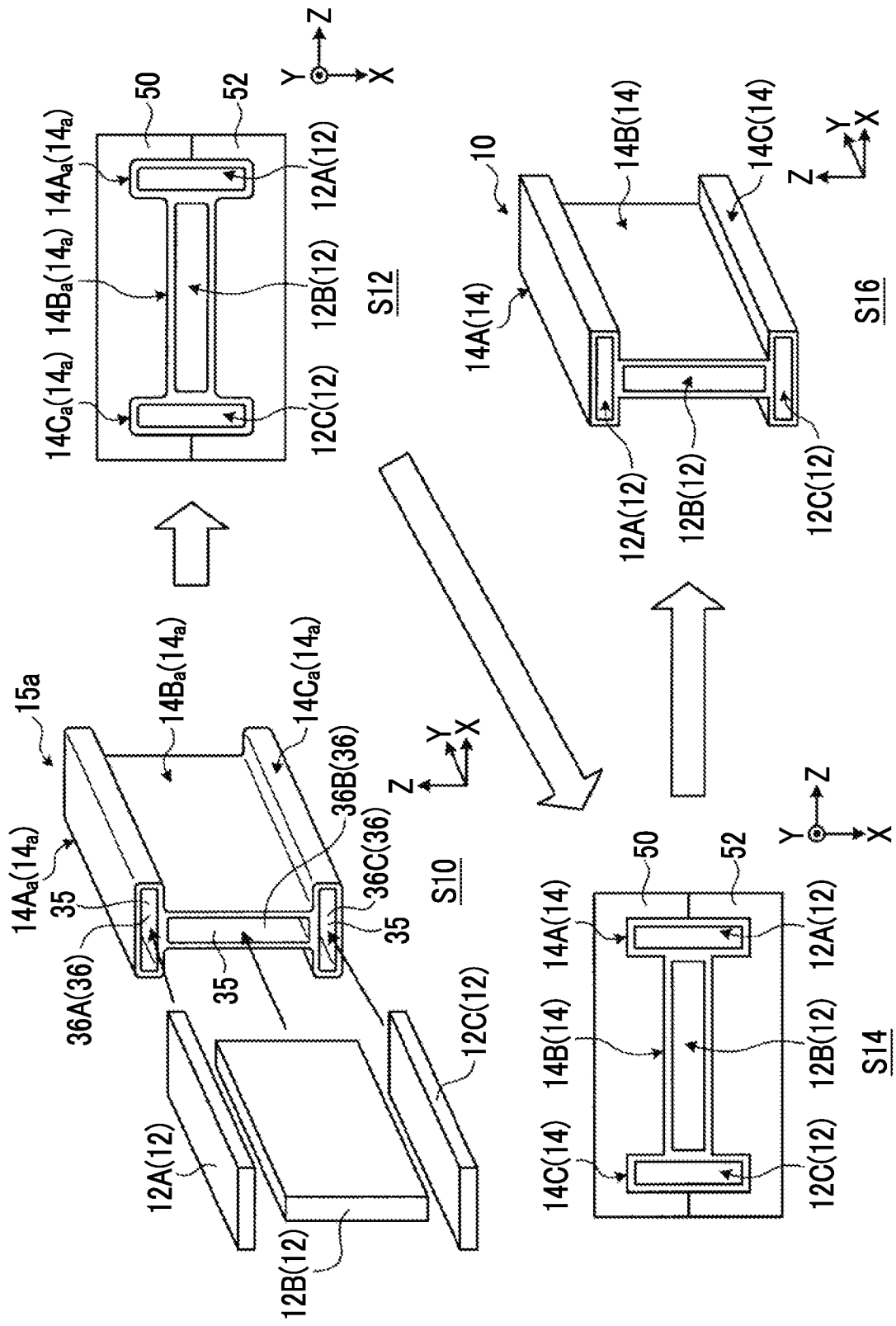

METHOD FOR PRODUCING COMPOSITE MATERIAL

TECHNICAL FIELD

The present invention relates to a method for producing a composite material and a composite material.

BACKGROUND ART

A composite material including a resin and reinforcing fibers is lighter than a metal material and further has higher specific strength and specific rigidity. Therefore, the composite material is used for various applications including a member of an aircraft. Typically, when a member is formed using this composite material, a sheet-shaped prepreg in which reinforcing fibers are impregnated with a resin is laminated for forming the member. For example, PTL 1 describes a configuration in which a laminate of a unidirectional material and a laminate of a random material are laminated. The unidirectional material is a sheet-shaped unidirectional (UD) material in which extending directions of reinforcing fibers are aligned in one direction. In addition, the random material is a sheet-shaped member in which extending directions of reinforcing fibers are random.

CITATION LIST

Patent Literature

[PTL 1] Japanese Unexamined Patent Application Publication No. 2016-5955

SUMMARY OF INVENTION

Technical Problem

However, when a unidirectional material or a random material is laminated to form a member, the strength of the compact increases, but it is difficult to realize a complex shape. Therefore, a composite material in which a desired shape can be easily realized and a decrease in strength can be inhibited is required.

The present invention has been made in order to solve the above-described problems, and an object thereof is to provide: a method for producing a composite material in which a desired shape can be easily realized and a decrease in strength can be inhibited; and the composite material.

Solution to Problem

In order to solve the above-described problems and to achieve the object, according to the present disclosure, there is provided a method for producing a composite material, the method including: an insertion step of inserting an inner member in which a second reinforcing fiber is impregnated with a resin into a space of an outer member that is formed of a woven first reinforcing fiber extending in an undulating manner, the outer member including an opening that is provided at at least one end portion and the space that communicates with the opening; and a composite material forming step of forming a composite material in which the outer member and the inner member are joined to each other by curing the resin of the inner member to join the outer member and the inner member to each other.

In the method for producing a composite material, the internal strength can be improved by the inner member in a state where the outer shape is formed by the outer member as a commingled material. Accordingly, in the production method, a composite material in which a desired shape can be easily realized and a decrease in strength can be inhibited can be produced.

It is preferable that, in the insertion step, the inner member is inserted into each of a plurality of outer members of a connection member, the connection member being formed by connecting outer circumferential surfaces of the outer members to each other.

It is preferable that, in the connection member, the first reinforcing fiber is provided across the outer members.

It is preferable that, in the insertion step, the inner member is inserted into the outer member while providing a heat generating member between the inner member and the outer member.

It is preferable that the outer member is formed of a woven fiber including a thermoplastic resin, and it is preferable that, in the composite material forming step, the thermoplastic resin included in the outer member is melted and cured to join the outer member and the inner member to each other.

It is preferable that the resin of the inner member is a thermoplastic resin that is the same material as the resin fiber.

It is preferable that the outer member is formed of the first reinforcing fiber that is three-dimensionally woven.

It is preferable that the inner member is a unidirectional material in which a plurality of second reinforcing fibers extending in one direction are impregnated with a resin.

It is preferable that the first reinforcing fiber and the second reinforcing fiber are formed of the same material.

In order to solve the above-described problems and to achieve the object, according to the present disclosure, there is provided a composite material that is produced using the above-described method for producing a composite material.

In order to solve the above-described problems and to achieve the object, according to the present disclosure, there is provided a composite material including: an outer member including a woven first reinforcing fiber and a resin layer that covers the first reinforcing fiber; and an inner member in which inner layers each of which includes a plurality of second reinforcing fibers extending in one direction and a resin covering the second reinforcing fibers overlap each other, in which the outer member is provided close to a circumference of the inner member.

In order to solve the above-described problems and to achieve the object, according to the present disclosure, there is provided a composite material including: an outer member including a first reinforcing fiber and a resin layer that covers the first reinforcing fiber; and an inner member in which inner layers each of which includes a woven second reinforcing fiber and a resin covering the second reinforcing fiber overlap each other, in which the outer member is provided close to a circumference of the inner member.

Advantageous Effects of Invention

According to the present invention, a desired shape can be easily realized and a decrease in strength can be inhibited.

BRIEF DESCRIPTION OF DRAWINGS

FIG. 6 is a diagram illustrating production steps of the composite material.

DESCRIPTION OF EMBODIMENTS

Hereinafter, a preferable embodiment of the present invention will be described in detail with reference to the accompanying drawings. The present invention is not limited to this embodiment. In addition, in a case where a plurality of embodiments are provided, the present invention also includes a combination of two or more of the embodiments.

Figure 1:
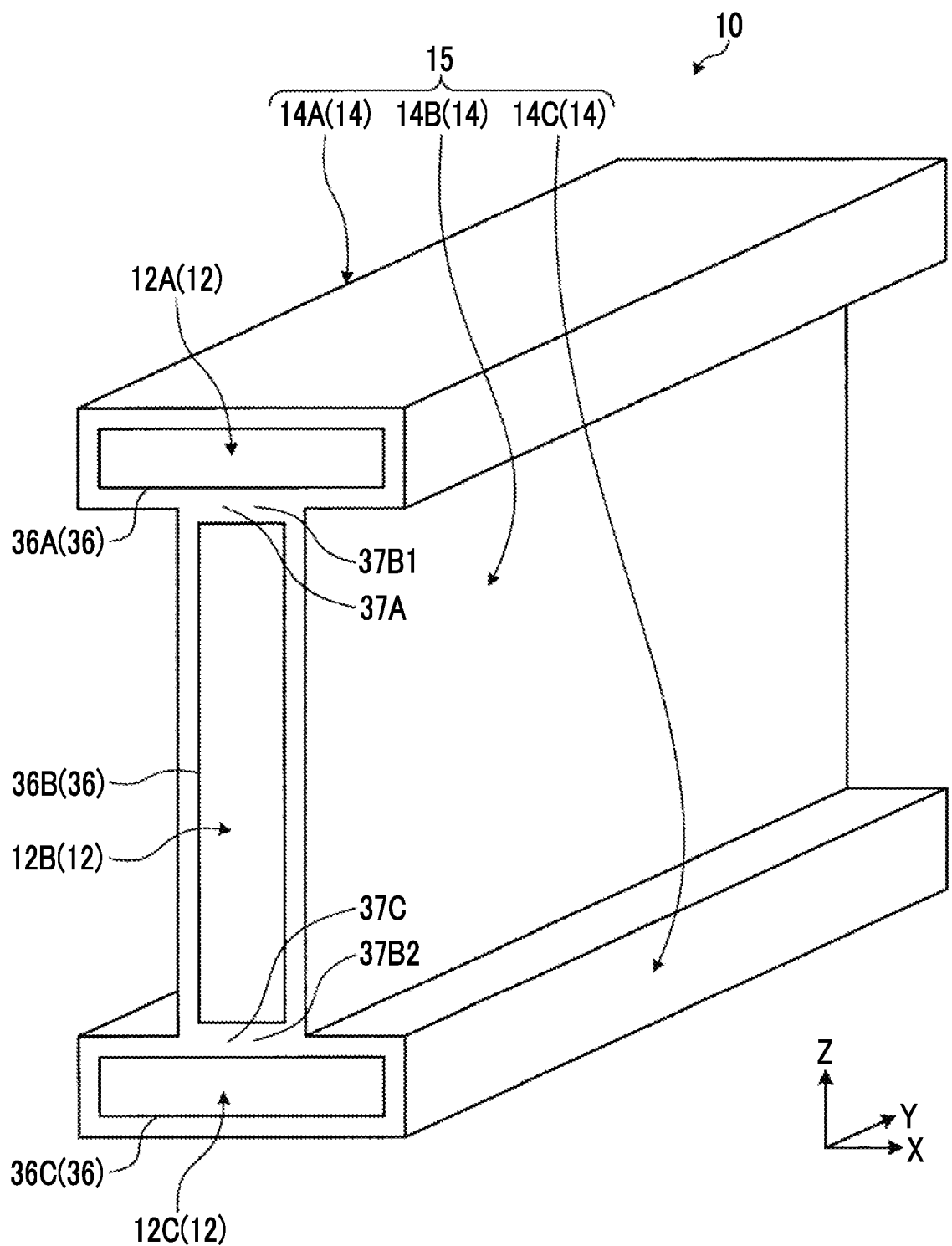
FIG. 1 is a schematic diagram illustrating a configuration of a composite material according to an embodiment.

FIG. 1 is a schematic diagram illustrating a configuration of a composite material according to an embodiment. A composite material 10 according to the embodiment is a member that is used for a product such as an aircraft. In the embodiment, the composite material 10 is a member having an I-shaped cross-section, but the present invention is not limited to this shape. In addition, hereinafter, a direction X, a direction Y perpendicular to the direction X, and a direction Z perpendicular to the direction X and the direction Y are defined.

As illustrated in FIG. 1, the composite material 10 according to the embodiment includes: inner members 12A, 12B, and 12C as cores; and outer members 14A, 14B, and 14C that cover the cores. The outer member 14A is a cylindrical member having an opening 36A. The outer member 14B is a cylindrical member having an opening 36B. The outer member 14C is a cylindrical member having an opening 36C. A connection portion 37A of the outer member 14A is connected to a connection portion 37B1 of the outer member 14B. In addition, a connection portion 37C of the outer member 14C is connected to a connection portion 37B2 of the outer member 14B. The connection portion 37A is an outer circumferential portion having a cylindrical shape of the outer member 14A. The connection portions 37B1 and 37B2 are outer circumferential portions having a cylindrical shape of the outer member 14B. The connection portion 37C is an outer circumferential portion having a cylindrical shape of the outer member 14C. That is, the outer circumferential surfaces of the outer members 14A, 14B, and 14C are connected to each other to form a connection member 15. The connection member 15 is formed in an I shape having the openings 36A, 36B, and 36C to which the cylindrical outer members 14A, 14B, and 14C are connected. The detailed structures of the outer members 14A, 14B, and 14C will be described below. In addition, when it is not necessary to distinguish between the outer members 14A, 14B, and 14C, the outer members 14A, 14B, and 14C will be referred to as the outer member 14. Likewise, when it is not necessary to distinguish between the openings 36A, 36B, and 36C, the openings 36A, 36B, and 36C will be referred to as the opening 36.

The inner member 12A is provided inside the opening 36A of the outer member 14A, and an outer circumferential surface thereof is joined to an inner circumferential surface (an outer circumferential surface of the opening 36A) of the outer member 14A. The inner member 12B is provided inside the opening 36B of the outer member 14B, and an outer circumferential surface thereof is joined to an inner circumferential surface (an outer circumferential surface of the opening 36B) of the outer member 14B. The inner member 12C is provided inside the opening 36C of the outer member 14C, and an outer circumferential surface thereof is joined to an inner circumferential surface (an outer circumferential surface of the opening 36C) of the outer member 14C. That is, the inner members 12A, 12B, and 12C are provided to block the openings 36A, 36B, and 36C of the outer members 14A, 14B, and 14C. In addition, when it is not necessary to distinguish between the inner members 12A, 12B, and 12C, the inner members 12A, 12B, and 12C will be referred to as the inner member 12.

Figure 2:
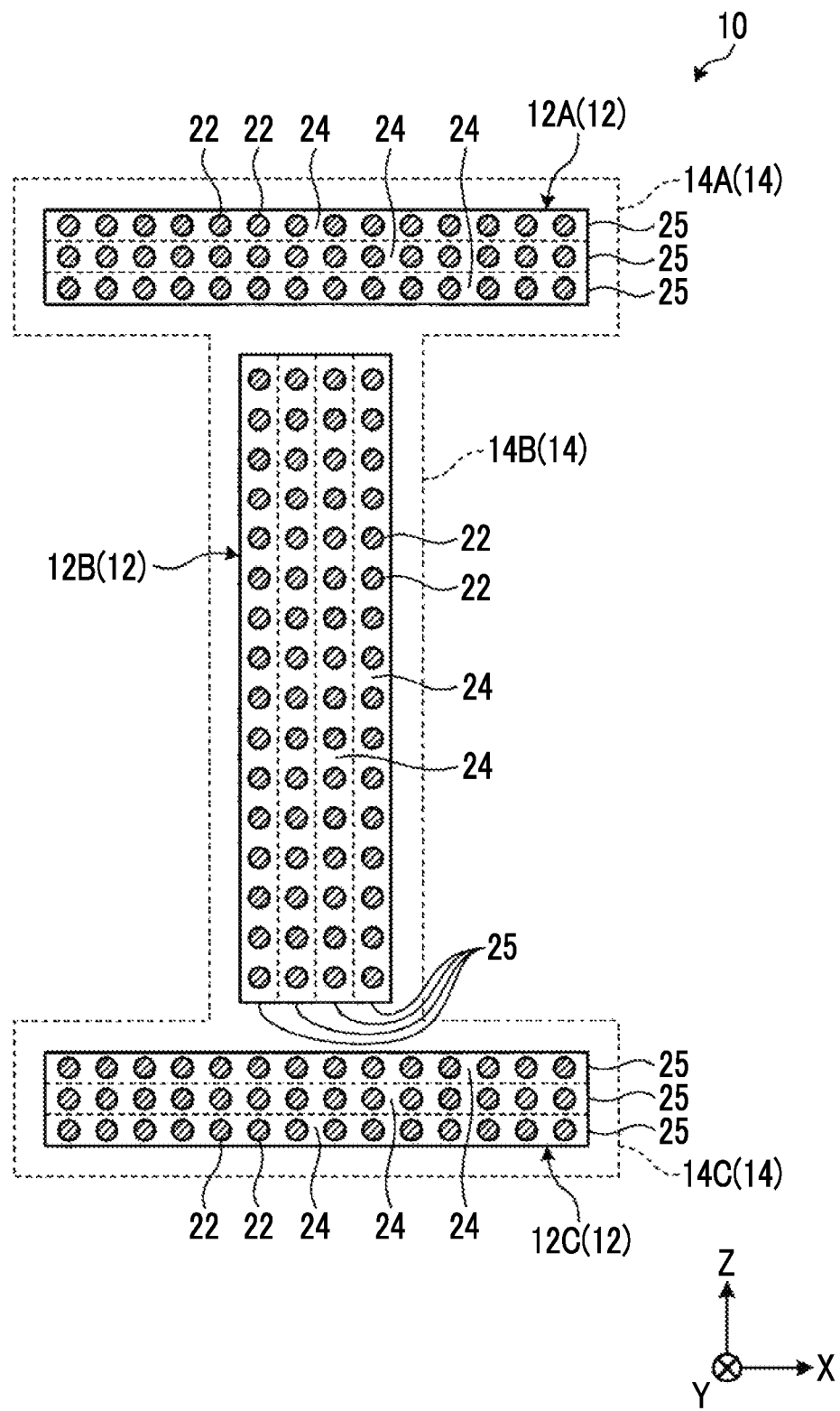
FIG. 2 is a schematic cross-sectional view illustrating an inner member.

FIG. 2 is a schematic cross-sectional view illustrating the inner member. The inner member 12 is a composite material including a reinforcing fiber 22 as a second reinforcing fiber and a resin 24, in which the reinforcing fiber 22 is impregnated with the resin 24. The reinforcing fiber 22 has higher strength than the resin 24. The reinforcing fiber 22 is a carbon fiber formed of carbon. In addition, the resin 24 is a thermoplastic resin that melts when heated up to a predetermined temperature. As the resin 24 that is a thermoplastic resin, for example, polyether ether ketone (PEEK), polyether ketone ketone (PEKK), or polyphenylene sulfide (PPS) is used. That is, in the embodiment, the inner member 12 is formed of carbon fiber reinforced thermo plastics (CFRTP). However, the reinforcing fiber 22 is not limited to carbon fiber and may be another plastic fiber, a glass fiber, or a metallic fiber. However, the resin 24 is not limited to a thermoplastic resin and, for example, may a thermosetting resin. As the thermosetting resin, for example, an epoxy resin is used.

As illustrated in FIG. 2, the inner member 12 has a configuration in which a plurality of inner layers 25 are laminated. The inner layer 25 is a layer in which a plurality of reinforcing fibers 22 are arranged in the layer of the resin 24 as a base material. However, since the inner layers 25 are joined to each other, it can be said that there is no interface between the inner layers 25. Accordingly, it can be said that the inner layer 25 is a layer including the reinforcing fibers 22 that are arranged in a line and the resin 24 that covers the reinforcing fibers 22.

In the embodiment, in the inner members 12A and 12C, the inner layers 25 are laminated along the direction Z, and the reinforcing fibers 22 are arranged in the inner layer 25 in the direction X. Regarding the inner members 12A and 12C, the length along the direction X is longer than the length along the direction Z, and the length along the direction Y is longer than the length along the direction X. In addition, in the inner member 12B, the inner layers 25 are laminated along the direction X, and the reinforcing fibers 22 are arranged in the inner layer 25 in the direction Z. Regarding the inner member 12B, the length along the direction Z is longer than the length along the direction X, and the length along the direction Y is longer than the length along the direction Z. However, a direction in which the inner layers 25 are laminated in the inner members 12A, 12B, and 12C and a direction in which the reinforcing fibers 22 are arranged in the inner layer 25 can be freely set.

In addition, as illustrated in FIG. 2, in the inner member 12, the reinforcing fibers 22 extend linearly along the direction Y in the resin 24 as a base material. That is, the inner member 12 is a unidirectional material, in other words, a UD material. It is preferable that, in the inner member 12, the reinforcing fibers 22 extend along the direction Y in which the length is longest. However, the direction in which the reinforcing fibers 22 extend is not limited to the direction Y as long as the reinforcing fibers 22 are arranged and extend in any direction. In addition, in the embodiment, in all the inner members 12A, 12B, and 12C, the reinforcing fibers 22 extend in the same direction. The extending directions of the reinforcing fibers 22 vary depending on the inner members 12. In addition, in the inner member 12, the extending directions of the reinforcing fibers 22 may vary depending on the inner layers 25. In addition, in the inner member 12, the extending directions of the reinforcing fibers 22 do not have to face only one direction and may face a plurality of directions. In addition, in the inner layer 25 of the inner member 12, the reinforcing fibers 22 extending in different directions (for example, the direction X and the direction Y) may be woven with each other. That is, the inner layer 25 may be a cloth material.

In addition, the inner member 12 does not have to be a laminate in which the inner layers 25 are laminated. For example, the inner member 12 may be configured such that a rope-shaped reinforcing fiber bundle in which the reinforcing fibers 22 are bundled and extend in one direction is covered with the resin 24. That is, the inner member 12 may have a structure in which the circumference of the reinforcing fiber 22 extending linearly is covered with the resin 24.

In addition, the reinforcing fiber 22 continuously extends from the vicinity of one end portion of the inner member 12 to the vicinity of another end portion thereof along the Y direction. That is, the reinforcing fiber 22 is a continuous fiber. However, the reinforcing fiber 22 is not limited to a continuous fiber and may be discontinuous halfway. In addition, it is preferable that the reinforcing fibers 22 extend linearly.

Figure 3:
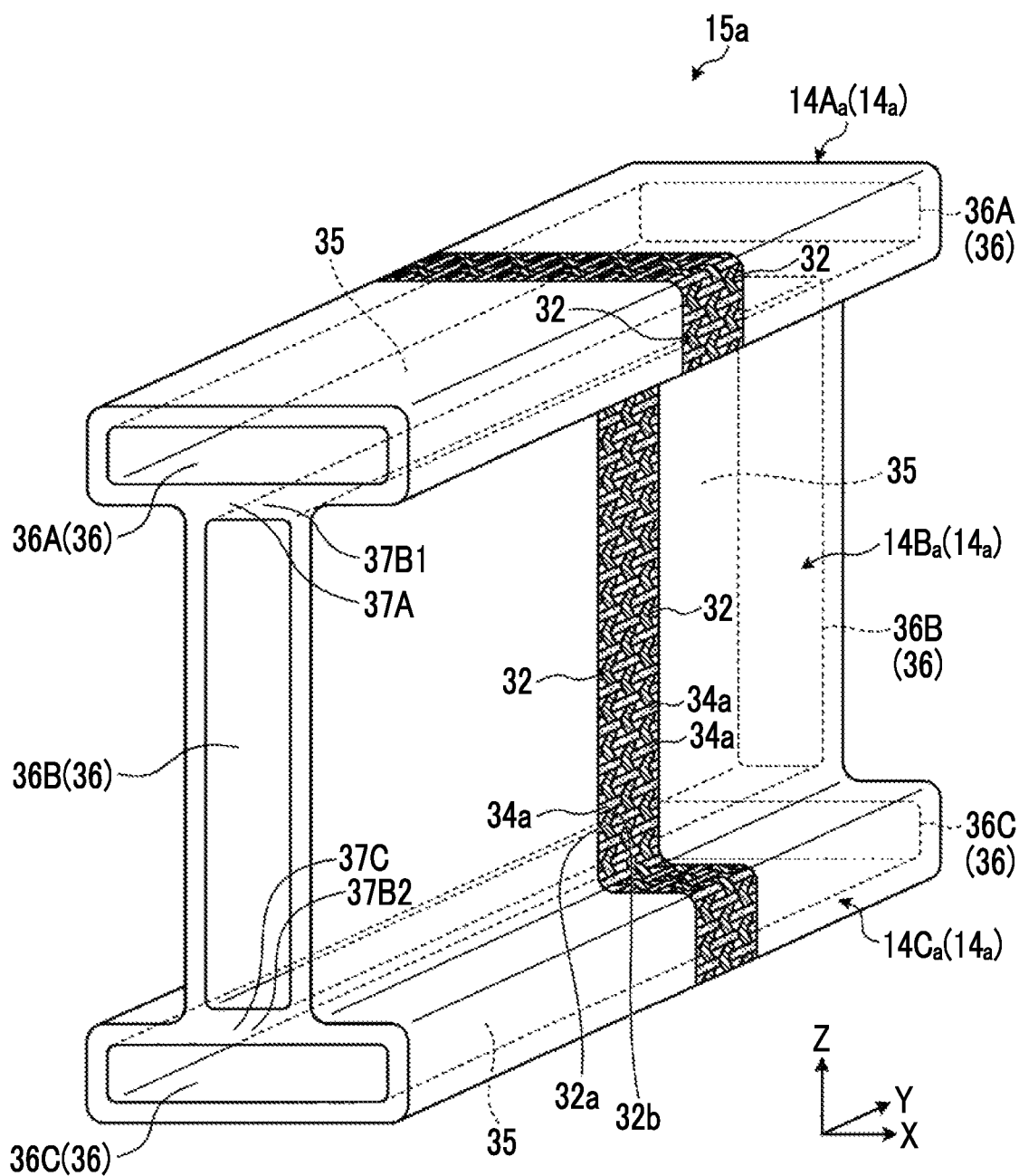
FIG. 3 is a schematic diagram illustrating an outer member before forming.

Next, the outer member 14 will be described. FIG. 3 is a schematic diagram illustrating the outer member before forming. An outer member 14a illustrated in FIG. 3 is the outer member before forming. In other words, the outer member 14a is the outer member 14 before being joined to the inner member 12. As illustrated in FIG. 3, an outer member 14Aa, an outer member 14Ba, and an outer member 14Ca as the outer members 14a are connected to form a connection member 15a. For convenience of description, in FIG. 3, reinforcing fibers 32 and resin fibers 34a are formed only in a region of a part of the outer member 14a. Actually, however, the reinforcing fibers 32 and the resin fibers 34a are formed in the entire region of the outer member 14a.

The outer member 14a is a cylindrical member that extends along the direction Y, and the opening 36 is formed across a region from one end portion to another end portion along the direction Y. The outer member 14a is formed by weaving the reinforcing fibers 32 as the first reinforcing fibers and the resin fibers 34a with each other. That is, the outer member 14a is a commingled material formed of a carbon fiber reinforced thermo plastic. The reinforcing fibers 22 of the inner member 12 are covered with the layer of the resin 24. On the other hand, in the outer member 14a, the reinforcing fibers 32 and the resin fibers 34a are exposed to the outside without being covered with another layer such as a resin layer. However, the circumference of the reinforcing fibers 32 is covered with the resin without being exposed to the outside. The opening 36 is formed on one end portion of the outer member 14a along the direction Y and does not have to extend up to another end portion of the outer member 14a along the direction Y as long as the inner member 12 can be inserted into the opening 36. That is, the outer member 14a may have a bag shape. In addition, a member that absorbs impact may be provided on a surface of the outer member 14a. In the example illustrated in FIG. 3, regarding the outer member 14a, the length along the direction Y, that is, the length in which the opening 36 is formed is longer than the lengths along the direction X and the direction Z, but the relationship between the lengths is not limited thereto. For example, regarding the outer member 14a, the length along the direction Y may be shorter than the lengths along the direction X and the direction Z.

This way, the outer member 14a has a cylindrical shape or a bag shape. In other words, it can be said that the outer member 14a is a hollow member including a space 35 and the opening 36. The opening 36 is formed at one end portion of the outer member 14a. The space 35 is provided inside the outer member 14a. The opening 36 and the space 35 communicate with each other. Accordingly, in the outer member 14a, as described below, the inner member 12 can be inserted from the opening 36 into the space 35. In the example of FIG. 3, in the outer member 14a, the opening 36 is provided at each of one end portion and another end portion, and each of the openings 36 has a shape (cylindrical shape) communicating with the space 35. However, in the outer member 14a, the opening 36 may be provided only at one end portion. In this case, the outer member 14a has a shape (bag shape) in which another end portion is blocked.

The reinforcing fibers 32 of the outer member 14a extend in an undulating manner by being woven. In the example of FIG. 3, the reinforcing fibers 32 extending along the direction Z undulate in both directions along the direction Y as they approach the direction Z as the extending direction. That is, the reinforcing fibers 32 extend to be inclined to the direction Y side as they approach the direction Z, and extend to be inclined to be opposite to the direction Y as they further approach the direction Z. The reinforcing fibers 32 extend in an undulating manner while repeating the above-described movement. More specifically, a portion 32a of the reinforcing fibers 32 and a portion 32b of the reinforcing fibers 32b that is positioned on the direction Z side further than the portion 32a are positioned at different positions in the direction Y. That is, the portion 32b is positioned on the direction Y side further than the portion 32a. This way, the reinforcing fibers 22 of the inner member 12 extend linearly, whereas the reinforcing fibers 32 of the outer member 14a extend in an undulating manner. The reinforcing fibers 22 of the inner member 12 do not have to be completely linear. The undulation (the difference in height between the portion 32a and the portion 32b) of the reinforcing fibers 32 of the outer member 14a may be greater than that of the reinforcing fibers 22 of the inner member 12. This way, the reinforcing fibers 32 extend in an undulating manner such that the bend allowance of the outer member 14a is secured and profile forming is simple.

The reinforcing fiber 32 is a carbon fiber formed of carbon and is formed of the same material as the reinforcing fiber 22 of the inner member 12. The reinforcing fiber 32 may be a fiber in which a carbon fiber and a resin fiber are mixed. In addition, the reinforcing fiber 32 may be formed of a material different from the reinforcing fiber 22 and may include, for example, another plastic fiber, a glass fiber, or a metallic fiber instead of the carbon fiber. By using a conductive metallic fiber as the reinforcing fiber 32, the conductivity of the surface of the composite material 10 can be improved, and lightning resistance can be improved. In addition, by using a conductive metallic fiber as the reinforcing fiber 22 of the inner member 12, a current can be made to flow through the inside of the composite material 10 along the Y direction, and a function as electric wire can also be imparted thereto.

The resin fiber 34a is a fiber including a resin and more specifically is a resin including a thermoplastic resin. The resin fiber 34a is formed of a thermoplastic resin and does not include another material other than unavoidable impurities. The resin fiber 34a may include another material component as long as it includes at least a thermoplastic resin. The resin fiber 34a is obtained by forming the same thermoplastic resin as the resin 24 of the inner member 12 in a fibrous form. As the resin fiber 34a that is a thermoplastic resin, for example, polyether ether ketone (PEEK), polyether ketone ketone (PEKK), or polyphenylene sulfide (PPS) is used. In addition, the resin fiber 34a may be formed of a material different from the resin 24 of the inner member 12 as long as it is a fibrous member including a thermoplastic resin.

The outer member 14a is a member that is formed in a cylindrical shape by weaving the reinforcing fibers 32 and the resin fibers 34a with each other. In the embodiment, the resin fibers 32 extend along the outer circumference, and the resin fibers 34a extend to mingle with the reinforcing fibers 32. That is, the reinforcing fiber 32 extends in a direction intersecting the resin fiber 34a and passes through a gap between two adjacent resin fibers 34a. Likewise, the resin fiber 34a also passes through a gap between two adjacent reinforcing fibers 32. The reinforcing fibers 32 and the resin fibers 34a are woven, for example, by double plain weaving. In addition, as illustrated in FIG. 3, the reinforcing fibers 32 extend in a direction of a circumference with a central axis of the outer member 14a as the center when seen from the direction Y, that is, a circumferential direction. The reinforcing fibers 32 are provided along the direction Y. The resin fibers 34a extend along the direction Y, are provided along the circumferential direction of the outer member 14a, and are woven with the reinforcing fibers 32. However, the reinforcing fibers 32 do not have to extend along the circumferential direction with the central axis of the outer member 14a as the center and may extend along another direction.

In addition, the reinforcing fibers 32 continuously extend across the circumference of the outer member 14a in the circumferential direction. That is, the reinforcing fiber 32 is a continuous fiber. However, the reinforcing fiber 32 is not limited to a continuous fiber and may be discontinuous halfway the circumference. In addition, the reinforcing fibers 32 extend along the circumferential direction. Therefore, it can be said that, assuming that the extending direction of the reinforcing fibers 22 of the inner member 12 is an axis direction, the reinforcing fibers 32 extend along the circumferential direction. That is, it can be said that the reinforcing fibers 32 extend around the reinforcing fibers 22 in the circumferential direction. More specifically, it is preferable that the reinforcing fibers 22 of the inner member 12 extend in a direction (here, the direction Y) in which a main load is applied and the reinforcing fibers 32 of the outer member 14a extend in the circumferential direction in which the reinforcing fibers 22 are bundled.

In addition, the outer member 14a includes a plurality of reinforcing fibers 32 but may include only one reinforcing fiber 32. In addition, the reinforcing fiber 32 continuously extends across a plurality of circumferences of the outer member 14a in the circumferential direction. Likewise, the outer member 14a may include a plurality of resin fibers 34a extending along the Y direction but may include only one resin fiber 34a. In this case, the resin fiber 34a is folded at an end portion of the outer member 14a along the Y direction and is arranged along the circumferential direction of the outer member 14a.

Figure 4A:
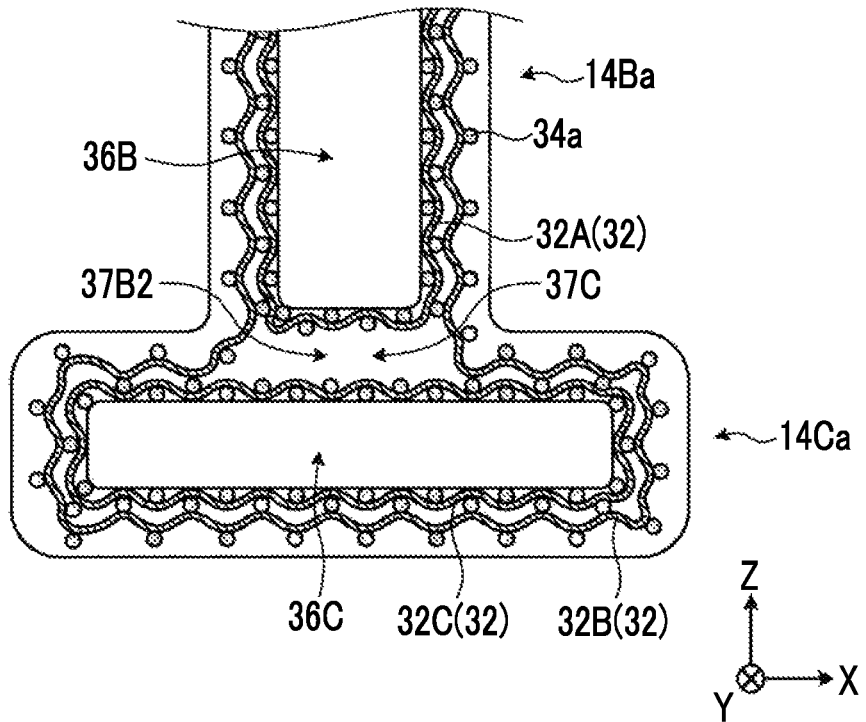
FIG. 4A is a schematic partial view illustrating the outer member before forming.

FIG. 4A is a schematic partial view illustrating the outer member before forming. As described above, the outer member 14Aa, the outer member 14Ba, and the outer member 14Ca are connected to each other. The reinforcing fibers 32 in the connection portion will be described. In the example of FIG. 4A, the connection portions between the outer member 14Ba and the outer member 14Ca, that is, the connection portions 37B2 and 37C will be described. The connection portion 37B2 and the connection portion 37C are connected to each other to be integrated. The reinforcing fibers 32 and the resin fibers 34a are also provided in the connection portions 37B2 and 37C. Specifically, the outer member 14Ba includes reinforcing fibers 32A and reinforcing fibers 32B as the reinforcing fibers 32. In addition, the outer member 14Ca includes reinforcing fibers 32C as the reinforcing fibers 32. The reinforcing fibers 32A extend along the circumferential direction of the outer member 14Ba and are provided across the circumference of the outer member 14Ba. That is, the reinforcing fibers 32A are woven in the connection portion 37B2. In addition, the reinforcing fibers 32C extend along the circumferential direction of the outer member 14Ca and are provided across the circumference of the outer member 14Ca. That is, the reinforcing fibers 32C are also woven in the connection portion 37C.

On the other hand, the reinforcing fibers 32B are provided across a range from the outer circumferential surface of the outer member 14Ba to the outer circumferential surface of the outer member 14Ca. That is, the reinforcing fibers 32A are provided around the outer circumference of the outer member 14Ba and is not provided in the other outer members 14Aa and 14Ca. The reinforcing fibers 32B are provided around the entire outer circumference of the connection member 15a (an aggregate of the outer member 14a). In other words, the reinforcing fibers 32B are provided across a plurality of outer members 14. The reinforcing fibers 32B are not provided in the connection portions 37B2 and 37C. The reinforcing fibers 32B are provided across all the outer members 14Aa, 14Ba, and 14Ca and only have to be provided across at least two outer members 14a adjacent to each other. The reinforcing fibers 32 in the connection portions 37A and 37B1 between the outer member 14Aa and the outer member 14Ba are also woven with the reinforcing fibers 32 in the connection portions 37B2 and 37C, and thus the description thereof will not be made.

Figure 4B:
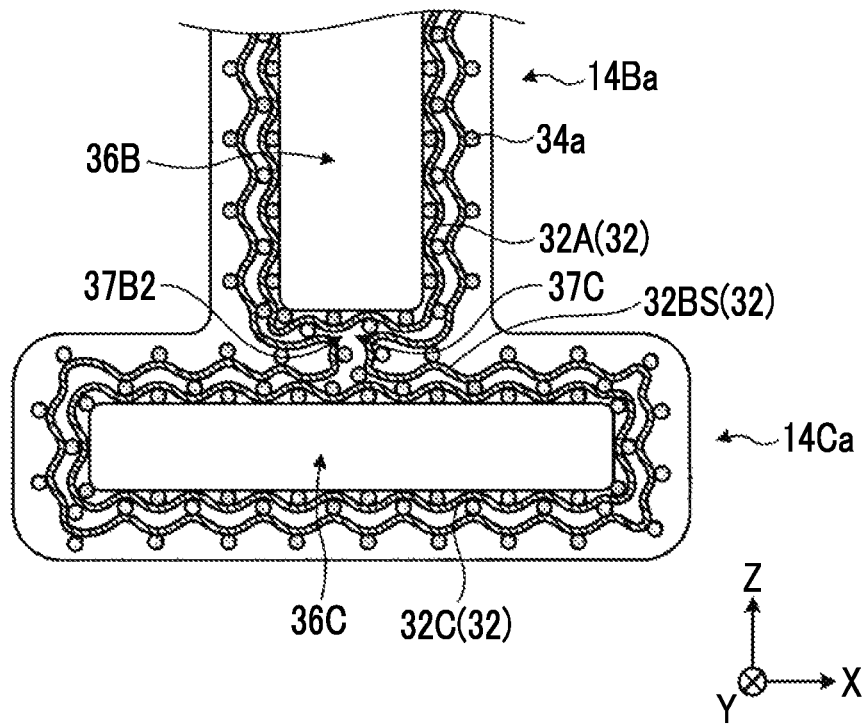
FIG. 4B is another example of a schematic partial view illustrating the outer member before forming.
Figure 4C:
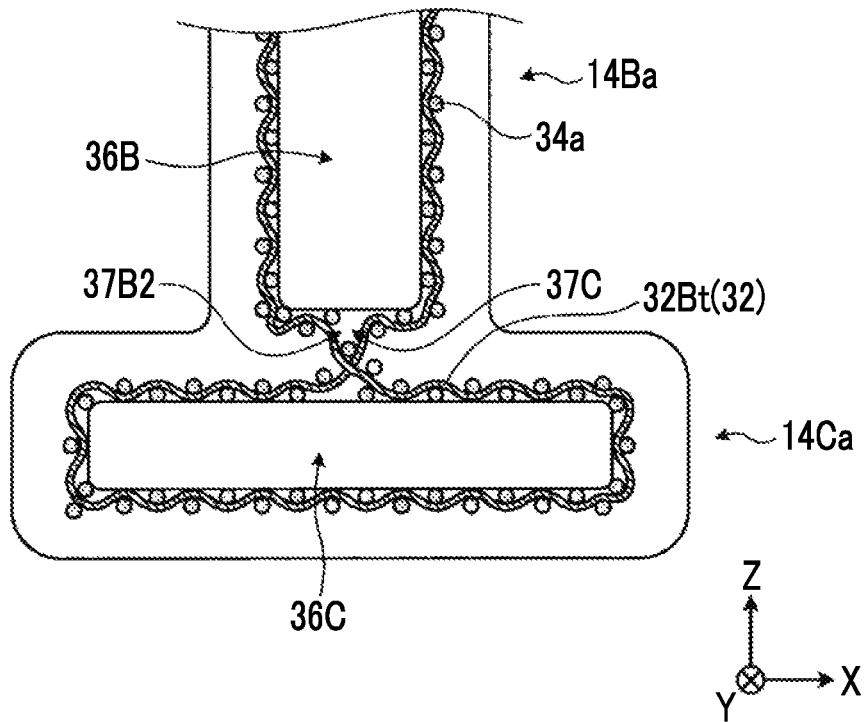
FIG. 4C is still another example of a schematic partial view illustrating the outer member before forming.
Figure 4D:
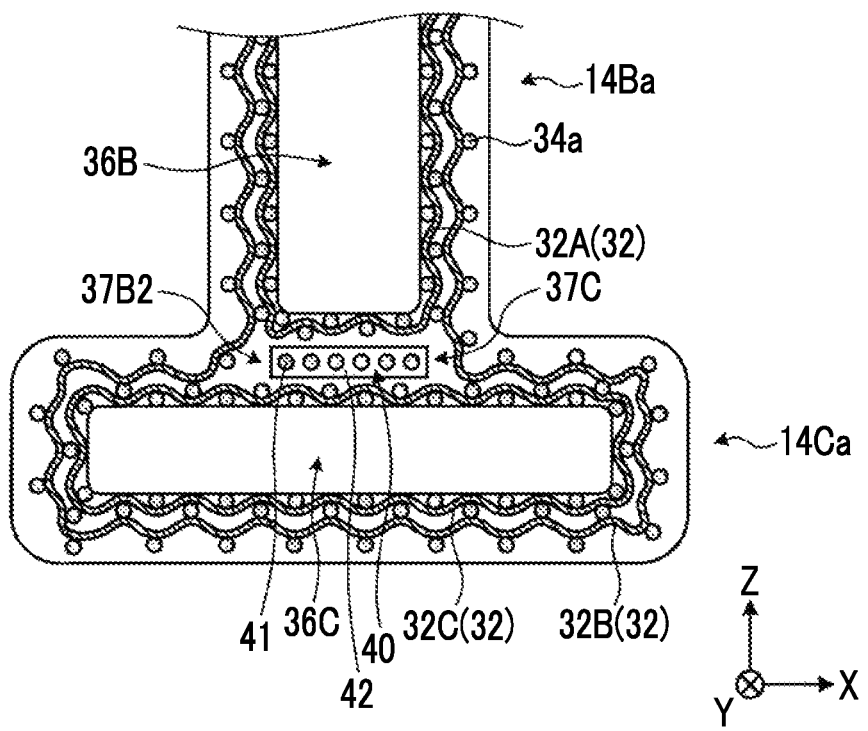
FIG. 4D is still another example of a schematic partial view illustrating the outer member before forming.

FIGS. 4B to 4D are other examples of a schematic partial view illustrating the outer member before forming. The arrangement of the reinforcing fibers in the connection portions 37B2 and 37C is not limited to the example of FIG. 4A. For example, as illustrated in FIG. 4B, the reinforcing fibers 34Bs may extend up to the inside of the connection portions 37B2 and 37C. In this case, it is preferable that the reinforcing fibers 34Bs extend along the direction Z in the connection portions 37B2 and 37C. When the outer member 14Ba and the outer member 14Ca receive a load in a direction (here, the direction Z) in which they peel off from each other, peeling can be favorably inhibited by the reinforcing fibers 34Bs.

In addition, as illustrated in FIG. 4C, a reinforcing fiber 32Bt may intersect each other in the connection portions 37B2 and 37C. In the example of FIG. 4C, one reinforcing fiber is illustrated. However, even when a plurality of reinforcing fibers are provided, the reinforcing fibers 32Bt may intersect each other in the connection portions 37B2 and 37C. By allowing the reinforcing fibers 32Bt to intersect each other in the connection portions 37B2 and 37C, a decrease in strength in the connection portions 37B2 and 37C can be favorably inhibited.

In addition, as illustrated in FIG. 4D, a member 40 may be provided in the connection portions 37B2 and 37C. The member 40 is a member including reinforcing fibers 41 and a resin layer 42 and is a UD material as in the inner member 12. By providing the member 40 in the connection portions 37B2 and 37C, a decrease in strength in the connection portions 37B2 and 37C can be favorably inhibited. However, the member 40 does not have to be a UD material as long as it is a member including reinforcing fibers. In addition, the member 40 is provided in the structure illustrated in FIG. 4A but may also be provided in the structures illustrated in FIGS. 4B and 4C.

This way the outer member 14a is a member that includes the reinforcing fibers 32 extending in an undulating manner and is formed in a cylindrical shape by weaving the reinforcing fibers 32 and the resin fibers 34a with each other. When the reinforcing fibers 32 are fibers in which carbon fibers and resin fibers are mixed, the resin fibers 34a do not have to be woven. That is, in the outer member 14a, the reinforcing fibers 32 in which carbon fibers and resin fibers are mixed may be woven with each other. In this case, it is not necessary that two reinforcing fibers 32 are woven as in the reinforcing fibers 32 and the resin fibers 34a illustrated in FIG. 3. One reinforcing fiber 32 may be woven, in other words, may be knitted. In addition, reinforcing fibers in which carbon fibers and resin fibers are mixed and reinforcing fibers that are carbon fibers and do not include resin fibers may be woven with each other.

Figure 5A:
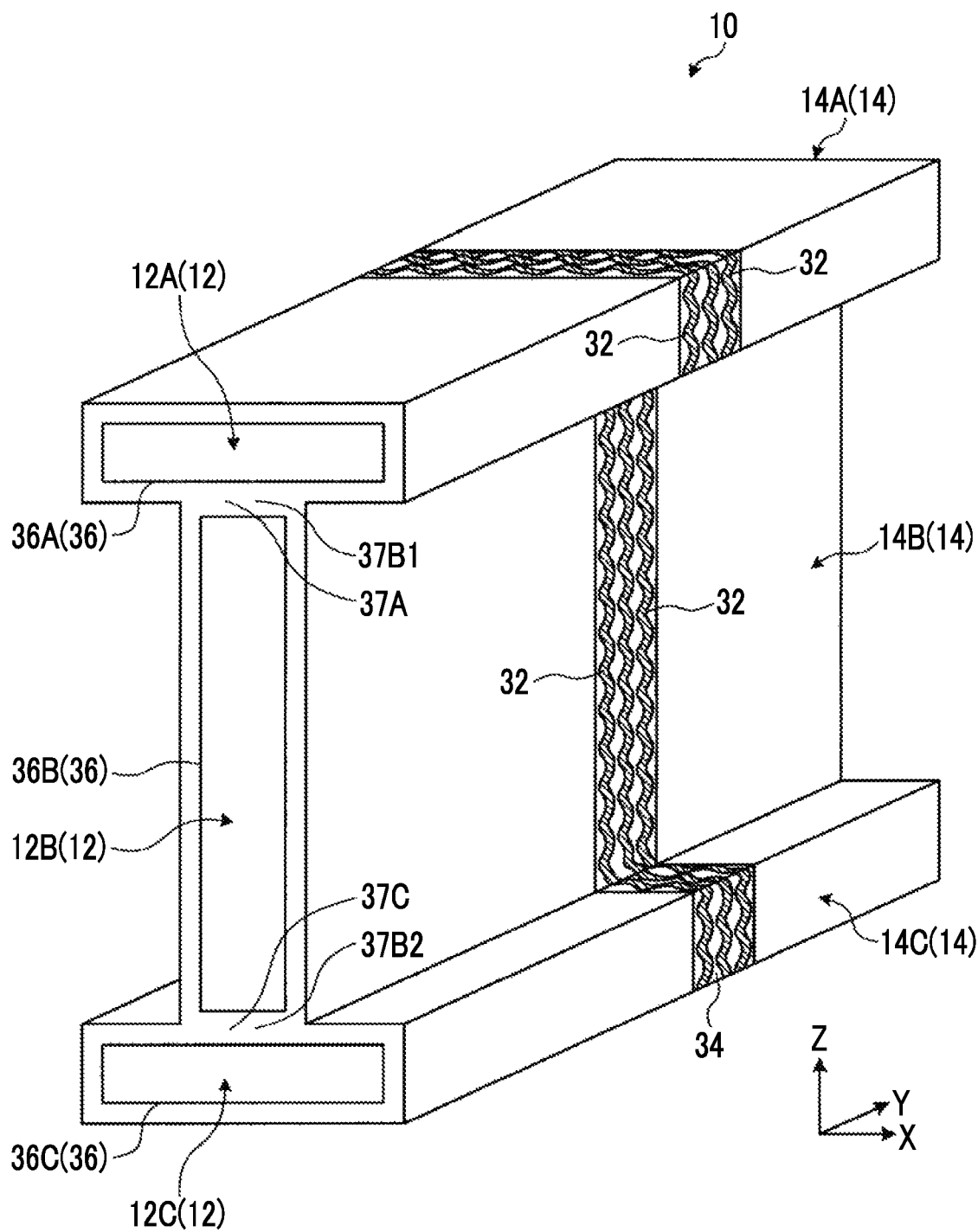
FIG. 5A is a schematic diagram illustrating the outer member after forming.

The inner member 12 is inserted into the above-described outer member 14a and is heated and cooled such that the outer member 14 is formed. FIG. 5A is a schematic diagram illustrating the outer member after forming. The resin fibers 34a in the outer member 14a are formed of a thermoplastic resin, and thus are melted by heating. The melted resin fibers 34a become a liquid resin, flow, are impregnated into the reinforcing fibers 32, and cover the circumference of the reinforcing fibers 32. When this liquid resin is cooled, the liquid resin is cured to form a resin 34. The outer member 14 is formed when the resin fibers 34a in the outer member 14a are melted and converted into the resin 34. That is, as illustrated in FIG. 5A, the outer member 14 is formed of a composite material including the reinforcing fibers 32 and the resin 34, in which the reinforcing fibers 32 are impregnated with the resin 34. More specifically, in the outer member 14, the reinforcing fibers 32 extend along the circumferential direction in the resin 34 as a base material. In addition, the reinforcing fibers 32 are woven with the resin fibers 34a in the state of the outer member 14a, and thus extend in an undulating manner. Accordingly, in the outer member 14, the reinforcing fibers 32 extend in an undulating manner while maintaining the state of the outer member 14a.

Figure 5B:
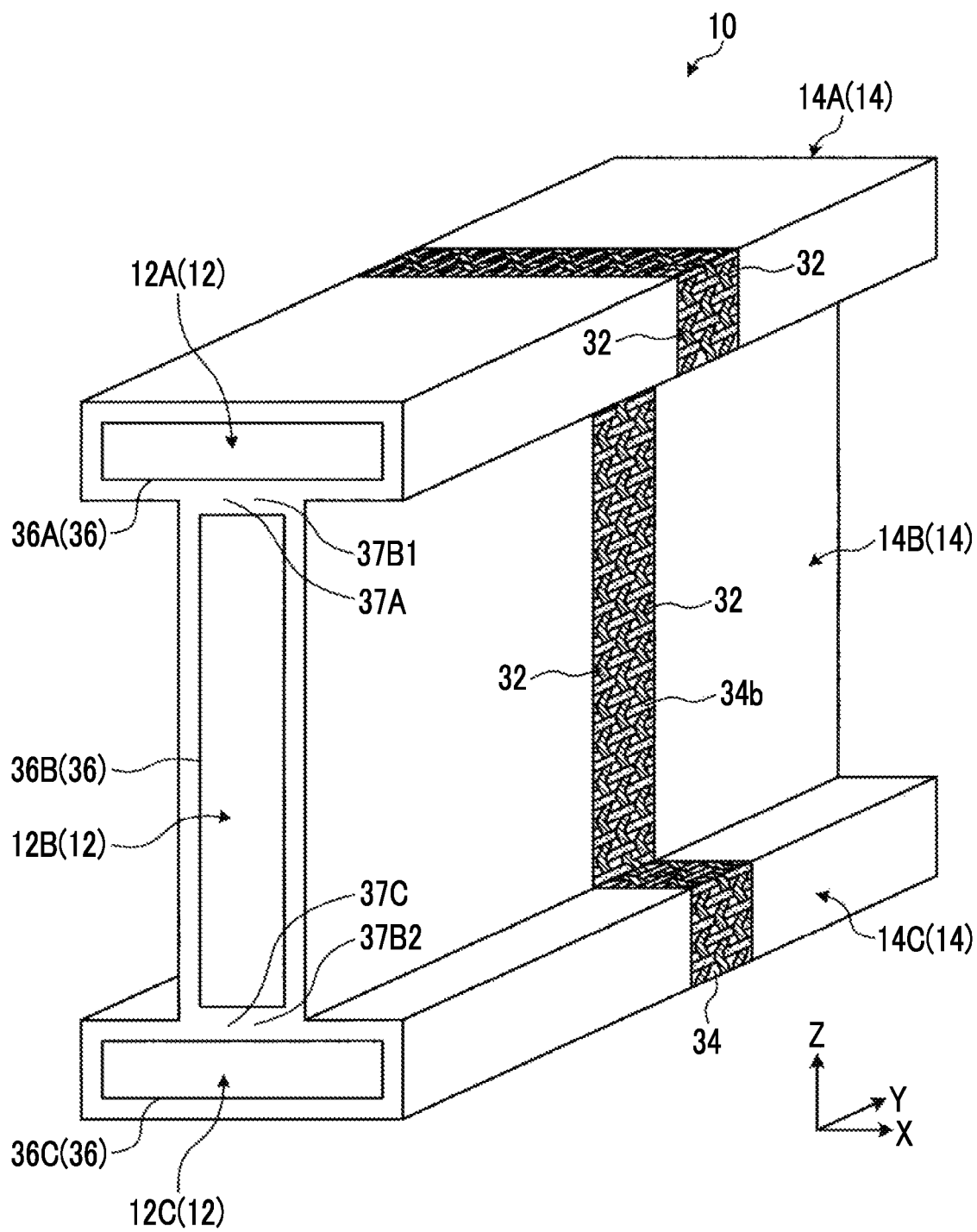
FIG. 5B is another example of a schematic diagram illustrating the outer member after forming.

FIG. 5B is another example of a schematic diagram illustrating the outer member after forming. When reinforcing fibers in which carbon fibers and resin fibers are mixed are used instead of the resin fibers 34a, the portion of the carbon fibers remain without being melted. In this case, as illustrated in FIG. 5B, the portion of carbon fibers 34b woven into the reinforcing fibers 32 remain. In this case, the outer member 14 after molding has a structure in which the reinforcing fibers 32 and the carbon fibers 34b that are woven with each other are covered with (impregnated with) the resin 34. This way, by allowing the carbon fibers 34b to remain, a state where the reinforcing fibers 32 are bundled by the carbon fibers 34b can be maintained, and a decrease in strength can be more favorably inhibited.

The composite material 10 includes the inner member 12 and the outer member 14 having the above-described structures. Hereinafter, production steps of the composite material 10 will be described. FIG. 6 is a diagram illustrating the production steps of the composite material. As illustrated in FIG. 6, when the composite material 10 is produced, first, the inner member 12 and the outer member 14a before forming are prepared. When a thermosetting resin is used as the resin 24, the prepared inner member 12 may be in a state of a prepreg before the curing of the resin 24 or may be in a state after the curing of the resin 24.

After preparing the inner member 12 and the outer member 14a, the inner member 12 is inserted into the outer member 14a (Step S10; insertion step). Specifically, the inner member 12A is inserted from the opening 36A of the outer member 14Aa into the space 35 thereof such that the inner member 12A is arranged in the outer member 14Aa. In addition, the inner member 12B is inserted from the opening 36B of the outer member 14Ba into the space 35 thereof such that the inner member 12B is arranged in the outer member 14Ba. In addition, the inner member 12C is inserted from the opening 36C of the outer member 14Ca into the space 35 thereof such that the inner member 12C is arranged in the outer member 14Ca. In Step S10, the inner circumference of the outer member 14a and the outer circumference of the inner member 12 are not joined. In addition, the inner circumference of the outer member 14a and the outer circumference of the inner member 12 are partially separated from each other without adhering to each other. In addition, a resin film may be inserted between the inner circumference of the outer member 14a and the outer circumference of the inner member 12 to improve joining properties.

In the insertion step, all the inner members 12 are inserted into the outer member 14a. However, only a part of the inner members 12 may be inserted into the outer member 14a. For example, in the insertion step, only a portion of the inner member 12 to be heated in the subsequent step may be inserted into the outer member 14a. For example, when the composite material 10 is joined to another member, the composite material 10 may be joined to another member after Step S16 described below. In this case, the inner member 12 on a surface to be joined to another member does not have to be inserted in the insertion step. When the inner member 12 is joined to another member, the inner member 12 is inserted into the outer member 14a and is heated for joining to the other member to be joined to the outer member 14.

After inserting the inner member 12 into the outer member 14a, the outer member 14a into which the inner member 12 is inserted is arranged in molds 50 and 52. In the example of FIG. 6, the mold 50 is pressed against one surface of the outer member 14a along the direction X, and the mold 52 is pressed against another surface of the outer member 14a along the direction X. That is, the outer member 14a is interposed between the mold 50 and the mold 52 to be accommodated in the molds 50 and 52. The outer member 14a is pressurized and heated in the molds 50 and 52 (Step S12; heating step). In the heating step, the outer member 14a is heated up to a temperature higher than or equal to a melting point of the resin fibers 34a. Therefore, the resin fibers 34a are melted to become a liquid resin. This liquid resin flows, is impregnated into the reinforcing fibers 32, and covers the circumference of the reinforcing fibers 32. The outer member 14a is formed of the liquid resin, an outer circumferential shape thereof is determined, for example, by the molds 50 and 52. In addition, the resin 24 of the inner member 12 is also melted. Accordingly, a space between the inner circumference of the outer member 14a and the outer circumference of the inner member 12 is closed (filled) with the melted resin 24 of the inner member 12 or the melted resin of the resin fibers 34a. Accordingly, the opening 36 of the outer member 14a is closed with the inner member 12.

After heating the outer member 14a into which the inner member 12 is inserted, the outer member 14a into which the inner member 12 is inserted is cooled (Step S14; cooling step). In the cooling step, the outer member 14a into which the inner member 12 is inserted is cooled up to a temperature lower than the melting point of the resin fibers 34a and is held at this temperature for a predetermined time in the molds 50 and 52. Accordingly, the melted resin of the resin fibers 34a is cured as the resin 34 and becomes the outer member 14. In addition, the resin 24 of the inner member 12 is also cured. By curing the liquid resin having a desired shape in the molds 50 and 52, the resin is cured while maintaining the desired shape. As a result, the composite material 10 is formed. In addition, the inner member 12 and the outer member 14 are joined to each other by curing the resin. In the embodiment, the heating step and the cooling step correspond to the composite material forming step.

After performing the cooling step to cure the resin, the composite material 10 is extracted from the molds 50 and 52 (Step S16; extraction step), and the production steps of the composite material 10 ends. When a thermosetting resin is used as the resin 24 and the inner member 12 in a state of a prepreg is used in the preparation step, the resin 24 is cured in the heating step. In addition, when a thermosetting resin is used as the resin 24 and the cured inner member 12 is used in the preparation step, the shape of the inner member 12 does not change in the heating step and the cooling step.

Here, for example, the inner member 12 is a member in which the reinforcing fibers are impregnated with the resin in a state of a prepreg. For example, in order to realize the I-shape of the composite material 10 using only this member, it is necessary to align two members having a C-shape and to vertically combine a gap and a filler. This way, the member in which the reinforcing fibers are impregnated with the resin in a state of a prepreg has a plate shape even in a state of a prepreg. Therefore, for example, it is difficult to bent the member, and it is difficult to form a complex shape. On the other hand, for example, the commingled material such as the outer member 14 has a structure in which the resin fibers as a resin and the reinforcing fibers are woven with each other in a state of a prepreg (before forming). More specifically, the reinforcing fibers extend in an undulating manner. Accordingly, even a complex shape can be realized by bending or the like. However, the commingled material tends to have a lower strength than the member in which the reinforcing fibers are impregnated with the resin in a state of a prepreg. Accordingly, for the composite material including the reinforcing fibers and the resin, it is required that a desired shape can be easily realized and a decrease in strength can be inhibited.

On the other hand, the composite material 10 according to the embodiment is produced by the insertion step and the composite material forming step. In the insertion step, the inner member 12 is inserted into the space 35 in the outer member 14a. The outer member 14a is formed of the woven reinforcing fibers 32 (first reinforcing fiber) extending in an undulating manner, the outer member 14a including the opening 36 that is provided at at least one end portion and the space 35 that communicates with the opening; 36. In the inner member 12, the reinforcing fibers 22 (second reinforcing fiber) are impregnated with the resin 24. In the composite material forming step, the composite material 10 is formed by curing the resin 24 of the inner member 12 to join the outer member 14 and the inner member 12 to each other. In the composite material 10, the outer member 14 and the inner member 12 are joined.

In the composite material 10 according to the embodiment, in the inner member 12, the reinforcing fibers 22 are impregnated with the resin 24. The outer member 14a is formed in a shape in which the opening 36 and the space 35 communicate with each other, that is, in a cylindrical shape by weaving the reinforcing fibers 32, and the reinforcing fibers 32 extend in an undulating manner by being woven. The outer member 14a covers the inner member 12. By curing the resin 24 of the inner member 12, the outer member 14 and the inner member 12 are joined to each other. The composite material 10 produced as described above has a structure in which the inner member 12 is provided in the outer member 14, in other words, a structure in which the outer member 14 is close to the circumference of the inner member 12. In the outer member 14a, the reinforcing fibers 32 extend in an undulating manner, and thus the degree of freedom for the shape is high. Accordingly, in the production method, the internal strength can be improved by the inner member 12 in a state where the outer shape is formed by the outer member 14a. Accordingly, in the composite material 10 produced using the above-described production method, a desired shape can be easily realized, and a decrease in strength can be favorably inhibited.

In addition, in the insertion step, it is preferable that the inner member 12 is inserted into each of the outer members 14a included in the connection member 15a. The connection member 15a is formed by connecting the outer circumferential surfaces of the outer members 14a. In the production method according to the embodiment, the composite material 10 is produced using the connection member 15a in which the outer circumferential surfaces of the cylindrical outer members 14a are connected. Accordingly, in the composite material 10 produced using the above-described production method, a desired shape can be easily realized, and a decrease in strength can be inhibited.

In addition, in the connection member 15a, the reinforcing fibers 32 as the first reinforcing fiber are provided across the outer members 14a. Accordingly, in the connection member 15a, a decrease in the strength of the surface can be more favorably inhibited. In addition, the reinforcing fibers 32 are continuous across the outer members 14. Therefore, for example, even when a part of the reinforcing fibers 32 are damaged, the strength can be secured by another portion of the reinforcing fibers 32.

In addition, the outer member 14a is formed of woven fibers including a thermoplastic resin. In the composite material forming step, the thermoplastic resin included in the outer member 14a is melted and cured to join the outer member 14a and the inner member 12 to each other. The outer member 14a is a commingled material formed of woven fibers including a thermoplastic resin. Accordingly, in the production method, the internal strength can be improved by the inner member 12 in a state where the outer shape is formed by the outer member 14 as the commingled material. Accordingly, in the composite material 10 produced using the above-described production method, a desired shape can be more easily realized.

In addition, it is preferable that the resin 24 of the inner member 12 is a thermoplastic resin that is the same material as the resin fibers 34a. By using the same material as the resins of the inner member 12 and the outer member 14, the inner member 12 and the outer member 14 can be favorably joined to each other.

In addition, it is preferable that the inner member 12 is an unidirectional material in which the reinforcing fibers 22 (second reinforcing fiber) extending in one direction are impregnated with the resin 24. By using the unidirectional material as the inner member 12, a decrease in the strength of the composite material 10 can be more favorably inhibited.

In addition, it is preferable that the reinforcing fibers 32 (first reinforcing fiber) and the reinforcing fibers 22 (second reinforcing fiber) are formed of the same material. By sharing the material of the reinforcing fibers by the inner member 12 and the outer member 14, a decrease in the strength of the composite material 10 can be more favorably inhibited. As described above, the reinforcing fibers 32 and the reinforcing fibers 22 can also be formed of different materials. In this case, an appropriate function can be imparted to the outer member 14 while imparting an appropriate function to the inner member 12.

Figure 7:
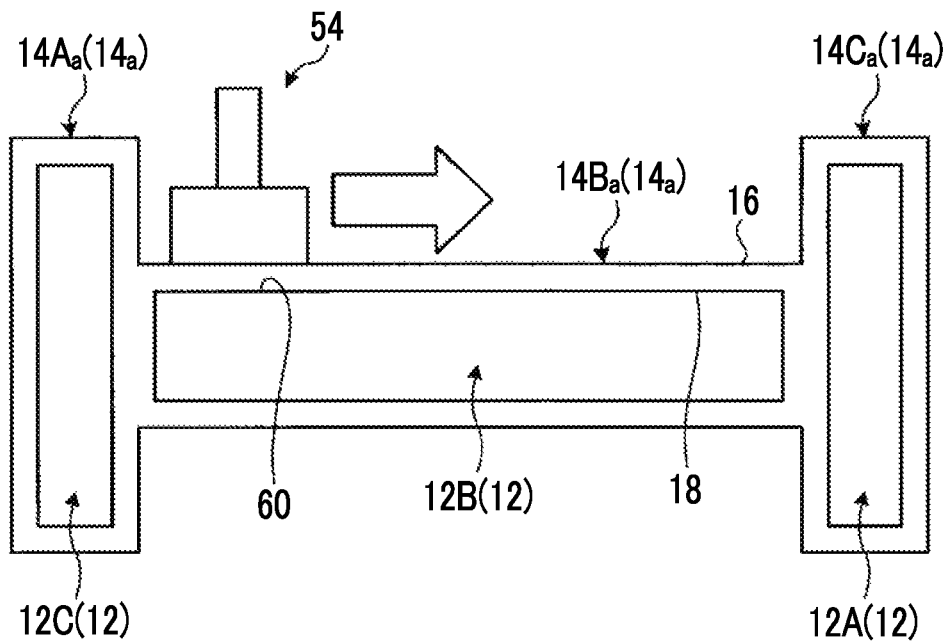
FIG. 7 is a schematic diagram illustrating another example of a heating step.

In the embodiment, in the heating step and the cooling step, the outer member 14a is pressurized by the molds 50 and 52. However, the molds 50 and 52 do not have to be used. FIG. 7 is a schematic diagram illustrating another example of the heating step. In the heating step, a pressurizing member 54 is brought into contact with an outer circumferential surface 16 of the outer member 14a. The pressurizing member 54 pressurizes the outer circumferential surface 16. In this case, the outer member 14a does not enter the molds 50 and 52, and a surface of the outer member 14a opposite to the outer circumferential surface 16 with which the pressurizing member 54 is brought into contact is open without being pressurized. The outer circumferential surface 16 of the outer member 14a is pressed by the pressurizing member 54, and an inner circumferential surface 18 of the outer member 14a is supported by the inner member 12. Accordingly, the outer member 14a is pressed (pressurized) by the pressurizing member 54 and the inner member 12. In addition, in the heating step, for example, the outer circumferential surface 16 of the outer member 14a that is pressed, for example, by the pressurizing member 54 is heated. As a result, the thermoplastic resin in the pressed outer member 14a is melted. When the inner member 12 also includes a thermoplastic resin, the thermoplastic resin on the surface of the inner member 12 is also melted and mixed with the thermoplastic resin of the outer member 14a. Next, by curing the thermoplastic resin in the cooling step, the outer member 14 having a desired shape can be obtained.

When heating is performed as described above, it is preferable that the inner member 12 has rigidity to some extent. Accordingly, for example, the pressurizing member 54 may be held at a temperature lower than a melting temperature of the resin 24 with respect to the inner member 12. In addition, by heating the pressurizing member 54 to a temperature higher than the melting temperature of the resin 24 of the inner member 12, an interface of the inner member 12 may be mixed with an interface of the outer member 14. In addition, it is also preferable that the inner member 12 including the cured resin 24 as a thermosetting resin is used. In this case, it is preferable that an adhesive layer is provided between the inner member 12 and the resin 24 for adhesion between the inner member 12 and the resin 24. That is, a film-shaped adhesive may be interposed between the inner member 12 and the resin 24, or may be applied to a gap between the inner member 12 and the resin 24.

In addition, as illustrated in FIG. 7, a heat generating member 60 may be arranged between the inner member 12 and the outer member 14a. In this case, in the heating step, the pressurizing member 54 is brought into contact with the outer circumferential surface 16 of the outer member 14a in a state where the heat generating member 60 is provided between the inner member 12 and the outer member 14a. The heat generating member 60 generates heat and is a sheet-like member that covers the outer circumferential surface of the inner member 12, in other words, the inner circumferential surface 18 of the outer member 14a. In the heating step, the heat generating member 60 heats the outer member 14a from the inner circumferential surface 18 side. Accordingly, even when, for example, only a portion that is pressed by the pressurizing member 54 is heated, the heat generating member 60 can promote the heating by assisting the heating to the inside of the outer member 14a. For example, it is preferable that the heat generating member 60 generates heat in the heating step and does not generate heat in the other steps. In addition, it is preferable that the heat generating member 60 is a member that has little effect on strength even when it remains in the composite material 10. Examples of the heat generating member 60 include a heat generating film including metal powder that generates heat using an electromagnetic field or the like and a film on which a heat generating electrode is printed. Alternatively, a heat generating circuit may be directly printed on the inner member 12. In addition, when a member that is ultrasonically vibrated is used as the pressurizing member 54, the heat generating member 60 may be an uneven film that functions as an energy director for the pressurizing member 54. In addition, the surface of the inner member 12 may be formed in an uneven shape in advance. In this case, for example, the uneven shape can be realized by depositing the heated resin on the surface of the inner member 12 by sputtering. In addition, when the film used as the heat generating member 60 is formed of the same material as the resin of the inner member 12 or the outer member 14, the film is mixed after heating, which is preferable. The heat generating member 60 does not have to be provided.

Figure 8:
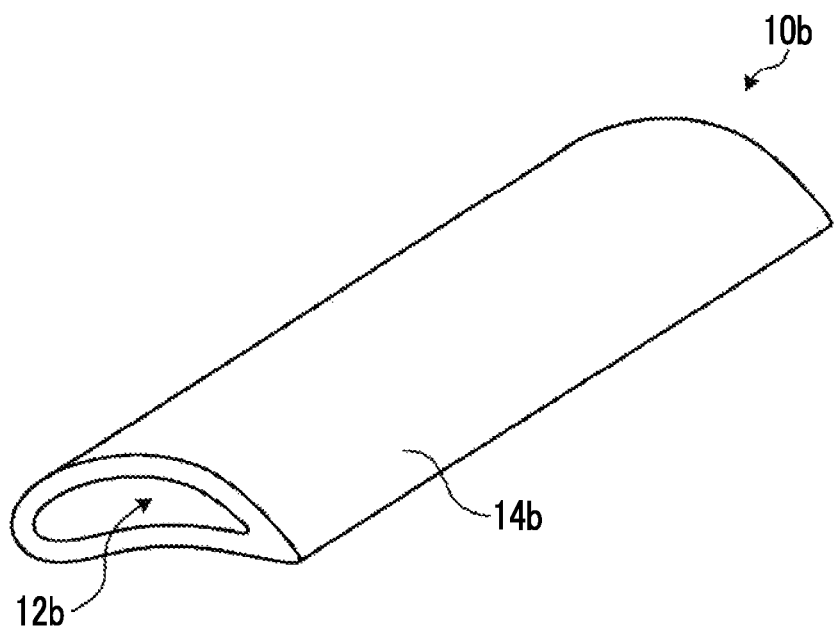
FIG. 8 is a diagram illustrating another example of a shape of the composite material.

FIG. 8 is a diagram illustrating another example of a shape of the composite material. In the embodiment, the composite material 10 has an I-shape, but the shape is not limited thereto as described above. For example, as illustrated in FIG. 8, a composite material 10b may have a aerofoil shape. The composite material 10b is produced through the same steps as those of the composite material 10 and has a shape in which the circumference of an inner member 12b as a core is covered with an outer member 14b.

Figure 9:
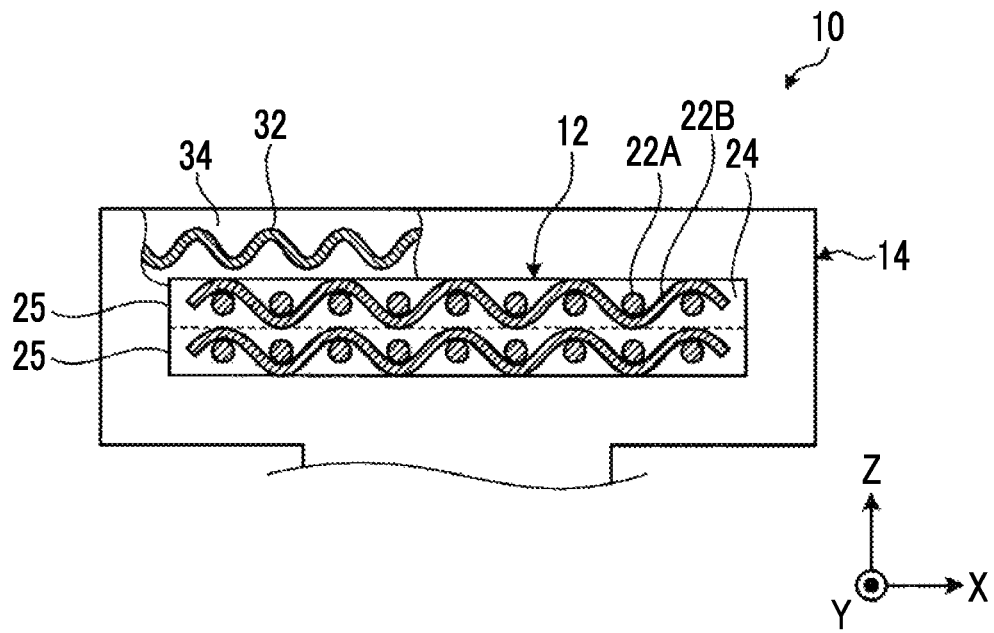
FIG. 9 is an example of a partial view illustrating the outer member after forming.

FIG. 9 is an example of a partial view illustrating the outer member after forming. When the outer member 14a is formed in a cylindrical shape by weaving the reinforcing fibers 32 not including resin fibers and the resin fibers 34a with each other and the reinforcing fibers 22 of the inner member 12 are woven with each other in the inner layer 25, the structure of the composite material 10 after forming is as illustrated in FIG. 9. That is, as illustrated in FIG. 9, the outer member 14 included in the composite material 10 is a cylindrical member including the reinforcing fibers 32 (first reinforcing fiber) and the resin 34 (resin layer) that covers the reinforcing fibers 32. In this case, the reinforcing fibers 32 are not woven with other fibers. On the other hand, the inner member 12 is provided close to the inside of the outer member 14. In other words, the outer member 14 is provided close to the circumference of the inner member 12. The inner member 12 is a member in which inner layers 25 each of which includes reinforcing fibers 22A and 22B (second reinforcing fibers) intersecting each other and the resin 24 covering the reinforcing fibers 22A and 22B overlap each other. In this composite material 10, a desired shape can be easily realized, and a decrease in strength can be favorably inhibited.

Figure 10:
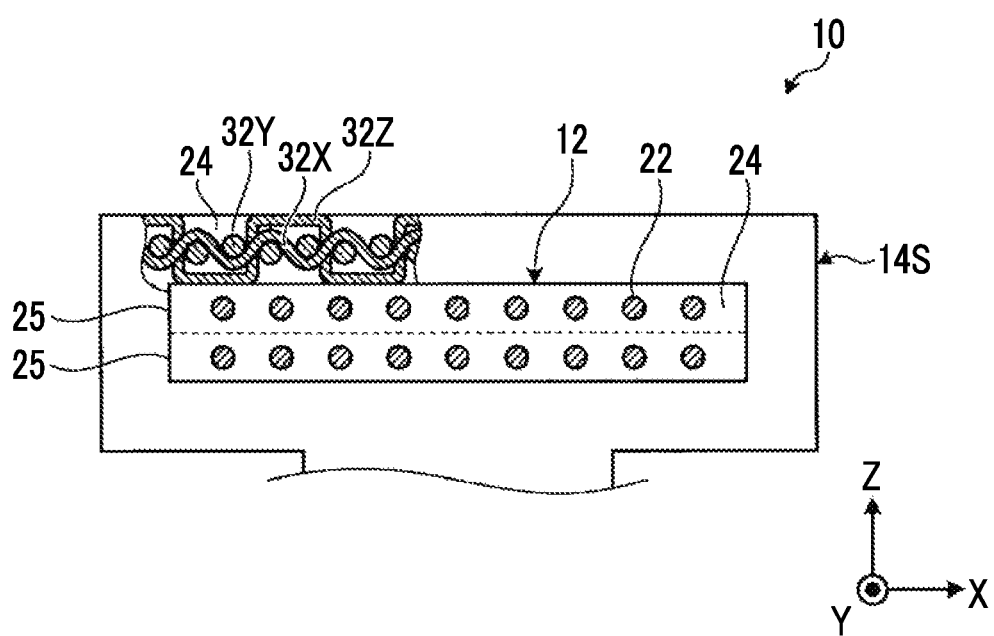
FIG. 10 is a schematic diagram illustrating another example of the composite material.

In addition, in the embodiment, the outer member 14 is a commingled material formed of woven fibers including a thermoplastic resin. However, the outer member 14 is not limited to a commingled material as long as it is formed in a cylindrical shape using woven reinforcing fibers 32 extending in an undulating manner. FIG. 10 is a schematic diagram illustrating another example of the composite material. As illustrated in FIG. 10, for example, an outer member 14S may be formed by three-dimensionally weaving reinforcing fibers 32X, 32Y, and 32Z (second reinforcing fibers). The reinforcing fibers 32X, 32Y, and 32Z are formed of the same material as the reinforcing fibers 32 and does not include resin fibers. However, the reinforcing fibers 32X, 32Y, and 32Z may include resin fibers.

The reinforcing fibers 32X extend along, for example, the direction X, the reinforcing fibers 32Y extend along, for example, the direction Y, and the reinforcing fibers 32Z extend along, for example, the direction Z. The reinforcing fibers 32X and the reinforcing fibers 32Y are woven with each other. The woven shape refers to a shape in which, for example, among two reinforcing fibers 32Y adjacent to each other along the direction X, one reinforcing fiber 32Y is positioned above one reinforcing fiber 32X along the Z direction and another reinforcing fiber 32Y is positioned below the same reinforcing fiber 32X along the Z direction. In addition, the reinforcing fiber 32Z meander while being inserted between the reinforcing fibers 32X and 32Y, and extends along the direction X or the direction Y. That is, the reinforcing fibers 32X, 32Y, and 32Z extend in an undulating manner by being woven.

In a state before forming, in the outer member 14S, the reinforcing fibers 32X, 32Y, and 32Z are not exposed to the outside without being covered with the resin layer. In the outer member 14S, during forming, for example, the melted resin 24 flowing out from the inner member 12 is impregnated into the reinforcing fibers 32X, 32Y, and 32Z such that the reinforcing fibers 32X, 32Y, and 32Z are covered with the resin 24 after forming. The surfaces of the reinforcing fibers 32X, 32Y, and 32Z may be covered with the resin before forming by applying a small amount of the resin thereto. In this case, the reinforcing fibers 32X, 32Y, and 32Z extend in an undulating manner. Therefore, even in the outer member 14S, a desired shape can be easily realized.

This way, in the composite material 10 illustrated in FIG. 10, the outer member 14S is a cylindrical member including: woven reinforcing fibers 32X, 32Y, and 32Z (a plurality of first reinforcing fibers) intersecting each other; and a resin layer that covers the reinforcing fibers 32X, 32Y, and 32Z. In addition, the inner member 12 is provided close to the inside of the outer member 14S. In other words, the outer member 14S is provided close to the circumference of the inner member 12. The inner member 12 is a member in which the inner layers 25 each of which includes a plurality of reinforcing fibers 22 (second reinforcing fibers) extending in one direction and the resin 24 covering the reinforcing fibers 22 overlap each other.

In addition, as illustrated in FIG. 5B, when reinforcing fibers in which carbon fibers and resin fibers are mixed are used instead of the resin fibers 34a, the outer member 14 before forming is a cylindrical member including: a plurality of woven first reinforcing fibers intersecting each other; and a resin layer that covers the first reinforcing fibers. The inner member 12 is a member in which the inner layers 25 each of which includes a plurality of reinforcing fibers 22 (second reinforcing fibers) extending in one direction and the resin 24 covering the reinforcing fibers 22 overlap each other. In this composite material 10, a desired shape can be easily realized, and a decrease in strength can be favorably inhibited.

Hereinabove, the embodiments of the present invention have been described. However, the embodiments are not limited to the contents of the embodiments. In addition, the above-described components include components that can be easily conceived by those skilled in the art, components substantially the same as the components, and components within a range of so-called equivalents. Further, the above-described components can be appropriately combined with each other. Further, various omissions, substitutions, or changes can be made for the components within a range not departing from the scope of the embodiments.

REFERENCE SIGNS LIST

10: composite material
12, 12A, 12B, 12C: inner member
14, 14a, 14A, 14Aa, 14B, 14Ba, 14C, 14Ca: outer member
22: reinforcing fiber (second reinforcing fiber)
24: resin
32: reinforcing fiber (first reinforcing fiber)
34: resin
34a: resin fiber
35: space
36, 36A, 36B, 36C: opening

The invention claimed is:
1. A method for producing a composite material, wherein an axial direction is a direction in which a main load is applied to the composite material and a circumferential direction is a rotational direction centered around the axial direction, the method comprising:
  inserting a plurality of inner members into a plurality of outer members of a connection member such that each inner member is inserted into an interior space of a respective one of the outer members, wherein
    the connection member is formed by connecting outer circumferential surfaces of the outer members to each other,
    each outer member is formed of a first layer of a woven first reinforcing fiber which extends in an undulating manner and which is provided entirely and continuously around an outer circumference of the outer member in the circumferential direction,
    each outer member includes an opening that is provided in at least one end portion of the outer member in the axial direction and that communicates with the interior space of the outer member, and each inner member includes a second reinforcing fiber impregnated with a resin; and forming a composite material in which the outer members and the inner members are joined to each other by hardening the resin of the inner members so as to completely fill the interior spaces of the outer members and close the openings of the outer members to join the outer members and the inner members to each other, wherein in the connection member in which the outer circumferential surfaces of the outer members are connected to each other, a second layer of the woven first reinforcing fiber is provided around an entire circumference of the connected outer members.

2. The method for producing a composite material according to claim 1, wherein in the inserting of the plurality of the inner members, a first inner member of the plurality of inner members is inserted into its respective outer member while providing a heat generating member between the first inner member and its respective outer member.

3. The method for producing a composite material according to claim 1, wherein a thermoplastic resin fiber is woven together with each of the first layers of the first reinforcing fiber and the second layer of the first reinforcing fiber, and in the forming of the composite material, the thermoplastic resin included in each layer of the first reinforcing fiber is melted and hardened to join the outer members and the inner members to each other.

4. The method for producing a composite material according to claim 3, wherein the resin of the inner members is a thermoplastic resin that is the same material as the thermoplastic resin fiber.

5. The method for producing a composite material according to claim 1, wherein each outer member is formed of the first layer of the woven first reinforcing fiber that is three-dimensionally woven.

6. The method for producing a composite material according to claim 1, wherein each inner member is a unidirectional material in which a plurality of the second reinforcing fibers extending in one direction are impregnated with a resin.

7. The method for producing a composite material according to claim 1, wherein the first reinforcing fiber and the second reinforcing fiber are formed of the same material.

* * * * *